United States Patent
Wiklund et al.

(10) Patent No.: US 12,500,946 B2
(45) Date of Patent: *Dec. 16, 2025

(54) CUSTOM CONTENT INSERTION FOR USER GROUPS

(71) Applicant: COMCAST CABLE COMMUNICATIONS, LLC, Philadelphia, PA (US)

(72) Inventors: Johannes Wiklund, McLean, VA (US); Corey Farrell, Lansdowne, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/182,006

(22) Filed: Mar. 10, 2023

(65) Prior Publication Data

US 2023/0208897 A1  Jun. 29, 2023

Related U.S. Application Data

(63) Continuation of application No. 13/830,030, filed on Mar. 14, 2013, now Pat. No. 11,627,173.

(51) Int. Cl.
*H04L 65/403* (2022.01)
*H04L 65/1069* (2022.01)
*H04L 65/75* (2022.01)

(52) U.S. Cl.
CPC ........ *H04L 65/403* (2013.01); *H04L 65/1069* (2013.01); *H04L 65/765* (2022.05)

(58) Field of Classification Search
CPC .. H04L 65/403; H04L 65/1069; H04L 65/765
See application file for complete search history.

(56) References Cited

U.S. PATENT DOCUMENTS

| | | | |
|---|---|---|---|
| 5,854,898 A | 12/1998 | Riddle | |
| 7,685,235 B2 | 3/2010 | Curran | |
| 8,122,142 B1 | 2/2012 | Svendsen et al. | |
| 8,943,145 B1 | 1/2015 | Peters | |
| 11,627,173 B2* | 4/2023 | Wiklund | H04L 65/765 709/224 |
| 2002/0049974 A1 | 4/2002 | Shnier | |
| 2003/0154300 A1 | 8/2003 | Mostafa | |
| 2003/0195891 A1 | 10/2003 | Marsh | |
| 2005/0143097 A1 | 6/2005 | Wilson et al. | |
| 2007/0214147 A1 | 9/2007 | Bodin | |
| 2008/0075095 A1 | 3/2008 | Suryanarayana et al. | |
| 2010/0189240 A1 | 7/2010 | Miller | |
| 2011/0264745 A1 | 10/2011 | Ferlitsch | |

(Continued)

OTHER PUBLICATIONS

BlackBerry Mobile Conferencing User Guide. http://docs.blackberry.com/en/smartphone_users/deliverables/39121/BlackBerry_Mobile_Conferencing-User_Guide--1908241-0130125759-001-3.0-US.pdf.

*Primary Examiner* — Soe Hlaing
(74) *Attorney, Agent, or Firm* — Ballard Spahr LLP

(57) ABSTRACT

Methods and systems for providing content to communication session participants are disclosed. In exemplary methods, at least one source can be monitored. Content relevant to a communication session having one or more participants can be identified from the at least one source. Additionally, the content can be provided as a part of the communication session in a format compatible with the communication session.

20 Claims, 5 Drawing Sheets

(56) References Cited

U.S. PATENT DOCUMENTS

| | | | |
|---|---|---|---|
| 2012/0011454 A1* | 1/2012 | Droz | G06Q 30/0241 |
| | | | 715/758 |
| 2012/0169835 A1* | 7/2012 | Woo | H04L 12/1827 |
| | | | 348/14.09 |
| 2012/0185534 A1 | 7/2012 | Zimmet | |
| 2013/0066978 A1* | 3/2013 | Bentley | H04L 12/1822 |
| | | | 709/204 |
| 2013/0096813 A1 | 4/2013 | Geffner | |
| 2013/0144619 A1 | 6/2013 | Lord | |
| 2013/0179440 A1 | 7/2013 | Gordon | |

* cited by examiner

CUSTOM CONTENT INSERTION FOR USER GROUPS

CROSS-REFERENCE TO RELATED PATENT APPLICATION

This application is a continuation of U.S. application Ser. No. 13/830,030, which was filed on Mar. 14, 2013, and is incorporated by reference in its entirety herein.

BACKGROUND

As companies and organizations grow, traditional face-to-face meetings in traditional conference rooms can be time consuming and costly. Organizations are increasingly using platforms that allow conferences over networks; however, users may have different preferences for media provided by such platforms. Thus, there is a need for more sophisticated methods and systems for providing media during communication sessions.

SUMMARY

It is to be understood that both the following general description and the following detailed description are exemplary and explanatory only and are not restrictive, as claimed. Some aspects relate to providing content to participants in a group communication session. In an example method, at least one source can be monitored. Content relevant to a communication session having one or more participants can be identified from the at least one source. The identified content can be provided as a part of the communication session in a format compatible with the communication session.

In another aspect, a list of participants associated with a group communication session, e.g., a conference session, can be received. At least one source associated with one or more of the participants can be identified. The at least one source can be monitored for content relevant to the communication session. Additionally, the content can be provided to an interface, such as a conference bridge, configured to present the content as a part of the communication session in a format compatible with the communication session.

In another aspect, an example system can comprise a bridge configured to establish a communication session having one or more participants. The systems can comprise a media controller communicatively coupled to the bridge. In one aspect, the media controller can be configured to monitor at least one source. The media controller can also be configured to identify content from the at least one source relevant to the communication session. The media controller can further be configured to provide the content to the bridge. In one aspect, the bridge can be configured to present the content as a part of the communication session in a format compatible with the communication session.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
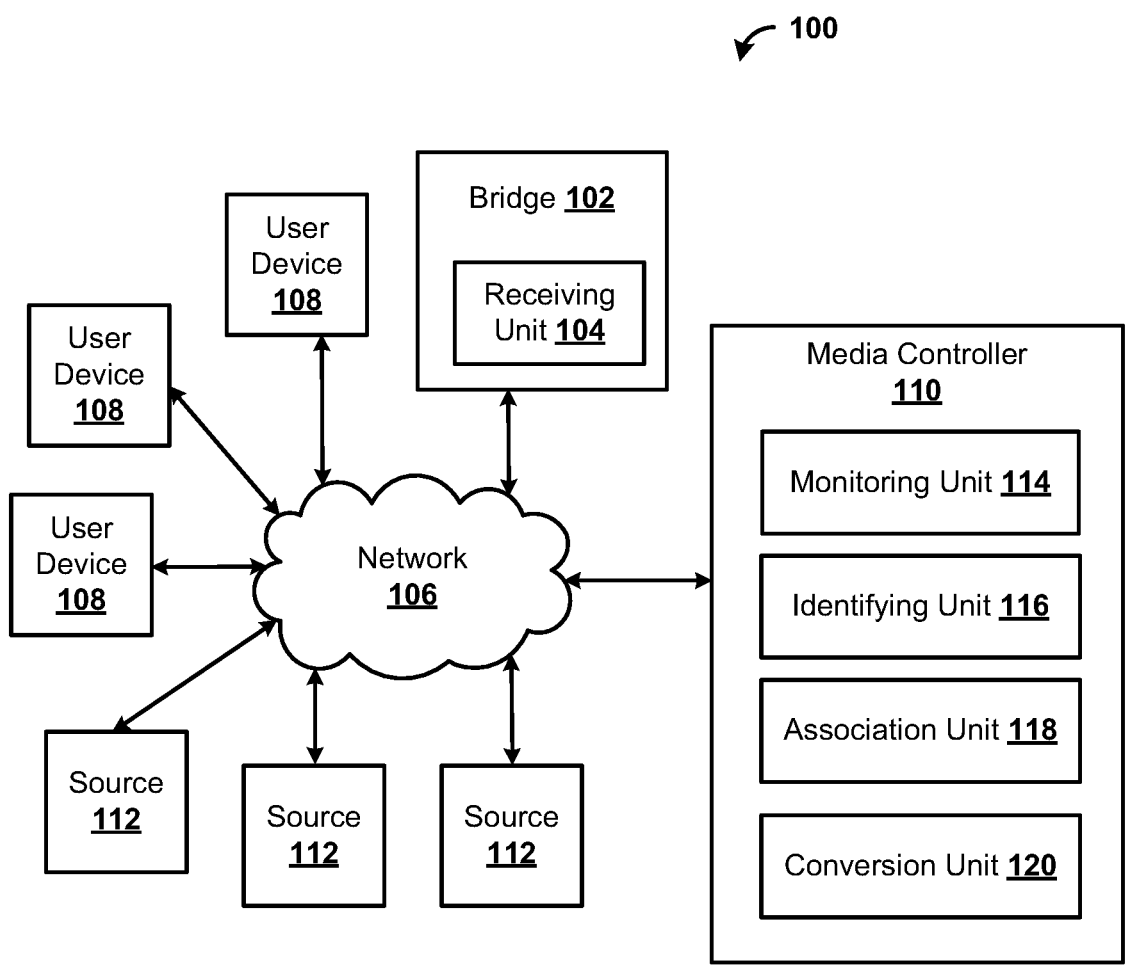
FIG. 1 is a block diagram illustrating various aspects of an example system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to providing content to a communication session, such as a conference session. As participants of a communication session wait for other participants to join the communication session, information can be provided to the waiting participants from the other participants or users that have not yet joined the communication session. Generally, users (e.g., participants or other parties) can provide content to a variety of sources, such as email servers, electronic message servers, social media systems, and the like. Aspects of the disclosure contemplate media elements, devices, and/or controllers configured to receive and/or retrieve this content from the sources and provide the content to the participants of the communication system.

FIG. 1 is a block diagram illustrating various aspects of an example system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In one aspect, the system 100 can comprise a bridge 102, such as a conference bridge. The bridge 102 can be a computing device, software, or combination thereof. The bridge 102 can be configured to provide one or more communication sessions, such as conference sessions, to a plurality of participants. The bridge 102 can comprise one or more receiving units 104 configured to receive requests for a connection through a network 106 by one or more user devices 108 of the participants. The bridge 102 can connect participants together in a communication session. For example, the bridge 102 can receive a communication session identifier from each of the participants. For example, participants of the same communication session can provide the same communication session identifier to indicate the communication session. In one aspect, the communication session identifier can comprise a unique combination of alphanumeric and/or other symbolic characters. As participants provide one or more communication session identifiers associated with a communication session, the bridge 102 can connect the user devices 108 of the participants together in a communication session. An example communication session can provide participants or other users the ability to communicate with other participants associated with the communication session through audio, video, text, images, and/or the like.

In one aspect, the network 106 can comprise a packet switched network, a circuit switched network (e.g., public switched telephone network), and or the like. The network 106 can comprise network adapters, switches, routers, and the like connected through wireless links (e.g., radio frequency, satellite) or physical links (e.g., fiber optic cable, coaxial cable, Ethernet cable). In one aspect, the network 106 can be configured to provide communication from telephone, cellular, modem, and/or other electronic devices to and throughout the system 100. In another aspect, the network 106 can comprise at least one of the first network 206 and the second network 210 of FIG. 2.

In one aspect, the system 100 can comprise a media controller 110 configured to provide content to the bridge 102. The media controller 110 can implemented as hardware, software, or a combination thereof. The media controller 110 can comprise, for example, a media server configured to provide media clips and other content to the bridge 102. In one aspect, the content provided by the media controller 110 can comprise video, audio, text, data, and the like. For example, the media controller 110 can be communicatively coupled to the bridge 102 through the network 106. As another example, the media controller 110 and bridge 102 can be implemented together on a computing device, and thus, the bridge 102 can communicate to the media controller 110 through an internal bus. In one aspect, the bridge 102 can comprise the communications gateway 202, session element 212, and media element 214 of FIG. 2.

In an aspect, the media controller 110 can comprise a monitoring unit 114 configured to monitor sources 112 for content relevant to (e.g., associated with, related to, derived from, transmitted to, and the like) one or more communication sessions. For example, the monitoring unit 114 can receive and/or retrieve content from one or more sources 112. In one aspect, the monitoring unit 114 can identify one or more sources 112 associated with users (e.g., the communication session participants). A source 112 can be a social media system, an email server, an electronic message server, a news provider, and the like. The content can be, for example, social media information, electronic contact information, telephone contact information, status information, news information, announcements, and the like. In some aspects, the content can be provided by the users from one or more user devices 108. The user device 108 can be a telephone, tablet device, laptop, smartphone, television, computer, or the like.

The users (e.g., communication session participants, users not participating other than by providing information to the source, and other parties) can communicate content to a communication session by providing the content to the sources 112. In another aspect, source information can be provided to the participants to indicate one or more sources 112 that can be used for communicating status information. For example, the users can communicate content to the media controller 110 by providing content from a user device 108 to a source 112 (e.g., server, email address, phone number, social media profile) previously provided to the participants.

As an illustration, several users can be connected on a communication session. One of the users who plans to participate in the communication session may be temporarily unable to participate. Thus, the user can provide status information such as a message indicating the user is running late, intends to be connected to the communication session in X number of minutes, or other information. The user can post content indicating the user's status on a Twitter account, Facebook wall or other content source. The media controller 110 can identify the content as relevant to the communication session and provide the content to the participants.

As another illustration, users may desire custom media to be provided to the communication session, such as an audio stream, video stream, or news feed. Accordingly, the media controller 110 can receive the custom media (e.g., filtering out an irrelevant content if there is any) and provide the custom media to the participants.

In another aspect, the media controller 110 can comprise an identifying unit 116 configured to identify, from the at least one source 112, content relevant to a communication session having one or more participants. In one aspect, content relevant to the communication session can comprise status information indicative of the arrival of a participant of the one or more participants to the communication session. For example, the content can indicate that a participant is running late, on another conference call, in traffic, in an emergency, and the like. The content can indicate an approximate arrival time or other information relevant to the communication session. Content can be any other supplemental information that has relevance to or is otherwise associated with the communication session, including but not limited to photos, audio, video, text, data, and the like.

In one aspect, the identifying unit 116 can retrieve and/or receive content from a variety of sources 112. The identifying unit 116 can process the content from the variety of sources 112 using artificial intelligence, natural language processing, search algorithms, and a variety of other processing techniques. For example, the identifying unit 116 can distinguish between content relevant to a communication session and content irrelevant to a communication session. As an example, content posted on a source can be intended for a variety of different purposes. One portion of content (e.g., post, message) listed on an electronic page or electronic file list can be intended for participants, while other portions of content (e.g., posts, messages) can be intended for other recipients (e.g., social network contacts).

Additionally, the identifying unit 116 can process an identifier, such as a keyword, phrase, or symbol, in the content indicating that the content is intended for the communication session. The identifying unit 116 can employ a variety of identification techniques, such as artificial intelligence, natural language processing, text parsing, and the like. For example, a hash tag (e.g., #) followed by an alphanumeric and/or other symbolic identifier meeting predefined criteria can indicate that the content is intended for a communication session. Identifiers can also comprise bridge numbers (e.g., a number associated with a bridge), uniform resource locators (URL), or other web based locations.

In one aspect, the media controller 110 can comprise an association unit 118. The association unit 118 can associate content received from a source 112 with a particular communication session. For example, a communication session can be associated with a communication session identifier, such as a unique identifier comprising alphanumeric characters and/or other visual or auditory symbols. In one aspect, the association unit 118 can associate content with a communication session based on which source 112 provided the content. For example, a source 112 can be associated with a specific user (e.g., communication session participant). Accordingly, content received from the source 112 associated with the user can also be associated with a communication session with which the user is associated. In another aspect, the association unit 118 can associate content with a communication session based on an identifier (e.g., phrase, symbol, sequence of numbers or characters) detected in the content. For example, the bridge 102 and/or media controller 110 can comprise a list and/or database of communication session identifiers and associations of the communication session identifiers with communication sessions.

In one aspect, the association unit 118 can be configured to associate content received from a source 112 with a limited group of the participants. For example, the content can be associated with an administrator of the communication session. As another example, the content can indicate specific participants for whom the content is intended. As an illustration, the identifier can be followed (e.g., as speech, text, video, audio) by the names and/or other information identifying one or more of the participants. As another illustration, the identifier can be a customized identifier configured to identify a limited group of participants. Accordingly, upon identifying information limiting the content to specific participants, the associating unit 118 can associate and/or provide the content to the specified participants.

In one aspect, the media controller 110 can comprise a conversion unit 120 configured to convert the content intended for the communication session to a format compatible with the communication session. For example, if the content is received as text, the conversion unit 120 can convert the text to an audio file comprising the text as speech. As another example, text can be converted from one format (e.g., social media message, status update, email) to another textual format (e.g. web conference notification, video overlay). In one aspect, the conversion unit 120 can convert between various video and audio formats. For example, the conversion unit 120 can convert one audio format to another audio format or one video format to another video format. As another example, the conversion unit 120 can convert from an audio format to a video format or a video format to an audio format. Various transcoding techniques and algorithms can be applied to convert between a variety of formats. As a further example, natural language processing can be used to convert from an audio or video format to a text format.

For purposes of illustration, several example sources 112 are described below. In one aspect, a source 112 can comprise a social media system (e.g., Twitter, Facebook, Orkut, Google plus, Linked-In, and the like). The social media system can provide social media information associated with social media users. In one aspect, social media information can comprise a status update, a notification, an interaction between social media users, a social media profile post, a message communicated between two social media users, and the like. As an example, a user can post a message to the social media system from a user device 108. The message can provide status information, such as time of arrival for a meeting, information indicating a current status of a participant, scheduling information, and the like. The social media information can be associated with an account of a participant or with an account associated with the bridge 102. Accordingly, the media controller 110 can receive and analyze information from the social media system associated with one or more participants of one or more communication sessions. As the media controller 110 identifies content relevant to particular communication sessions, the content can be provided to other participants of the communication session.

In another aspect, a source 112 can comprise an email server. An example email server can receive electronic messages directed to one or more electronic addresses. For example, a user can provide to an email server from a user device 108 an electronic message indicating an electronic destination address. Then, the email server can provide the electronic message to the electronic destination address. In one aspect, the destination address can be a destination address associated with a communication session. In another aspect, the destination address can be associated with the bridge 102 hosting one or more communication sessions. Accordingly, the media controller 110 can be configured to receive email at the destination address. In one aspect, the email message can comprise text, such as a symbol, keyword, phrase, and the like, that can identify a particular communication session. The media controller 110 can detect the identifying text in the email and provide content from the email to the participants associated with a communication session (e.g., the participants already connected on the communication session).

In an aspect, a source 112 can comprise an electronic message server configured to receive and send electronic messages (e.g., short message service text messages). As an example, an electronic message can comprise a text message transmitted through a cellular data network, wireless network, telephone network, and the like. In one aspect, a user can send an electronic message, for example, from the user device 108 (e.g., mobile electronic device, cellular phone) to a telephone number associated with the media controller 110. Therefore, the media controller 110 can receive and analyze the electronic message sent to the associated telephone number. The media controller 110 can associate the electronic message with a communication session. Then, the media controller 110 can provide content from the electronic message to the participants associated with a communication session.

In another aspect, a source 112 can comprise a news provider. Thus, the media controller 110 can provide the news from the news provider by playing an audio stream of the news, displaying a headline, playing an audio text-to-speech rendition of the news, and the like. In another aspect, the source 112 can comprise a live broadcaster. The media controller 110 can provide an audio and/or video feed from a live broadcast (e.g., sports game, political event, talk show) provided by the live broadcast. In another aspect, a source 112 can comprise a company information provider. For example, the company information provider can provide announcements from the company. The company information provider can provide urgent messages (e.g., "Please finish meetings now to address urgent problem."). The media controller 110 can provide the announcements, urgent messages, and/or other information from the company information provider to participants of one or more communication sessions.

Figure 2:
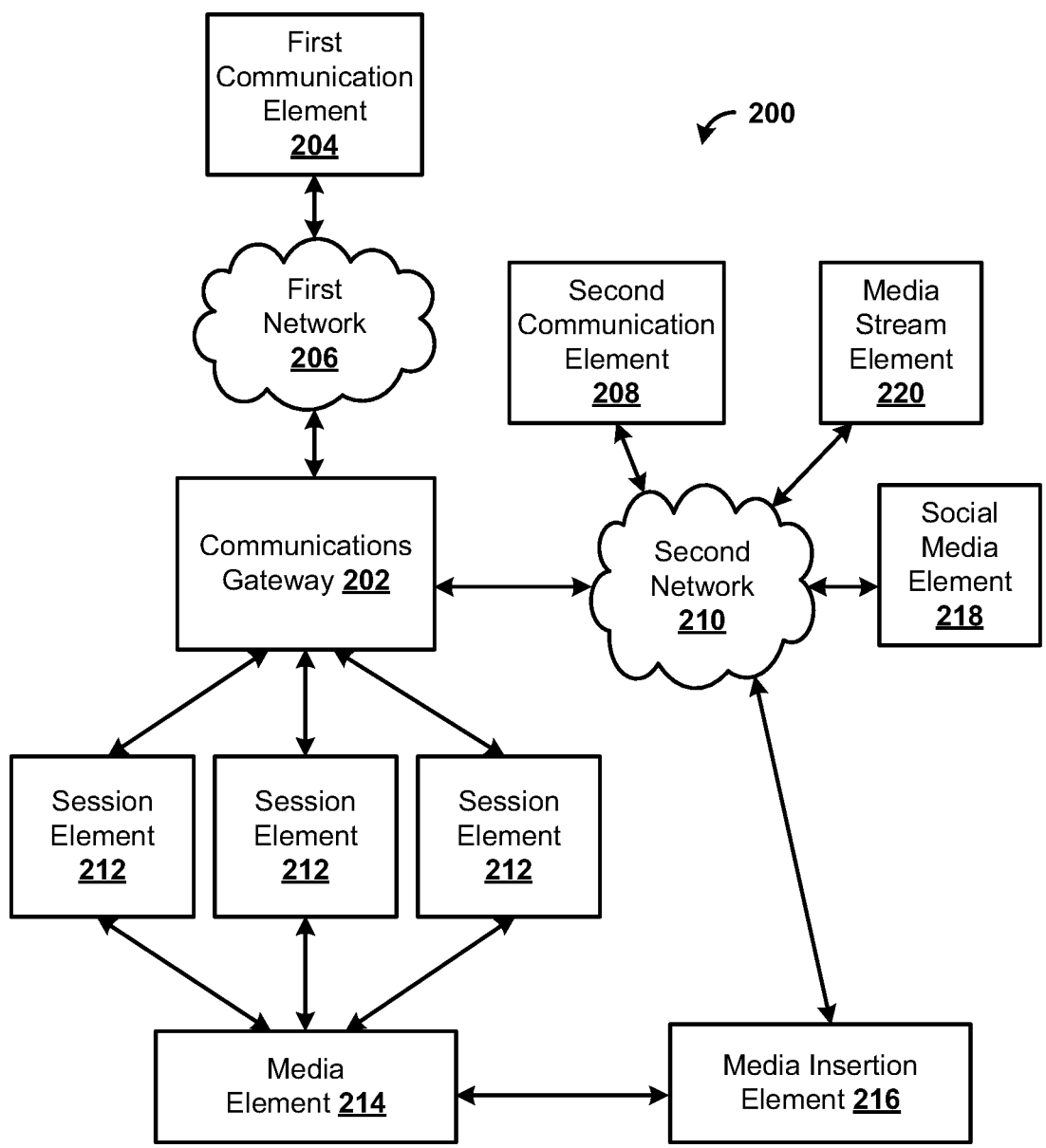
FIG. 2 is a block diagram illustrating another example system for providing content to a communication session.

FIG. 2 is a block diagram illustrating another example system 200 for providing content to a communication system. In one aspect, the system 200 can comprise a communications gateway 202 configured to receive communications from a variety of devices through a variety of networks. For example, the communications gateway 202 can be communicatively coupled to a first communication element 204 (e.g., a telephone) through a first network 206. For example, the first network 206 can comprise a circuit switched network (e.g., public switched telephone network), packet switched network, and/or the like. The first network 206 can comprise wireless links (e.g., satellite, cellular, WI-FI, WIMAX) and/or wired links (e.g., fiber optical cable, coaxial cable, Ethernet cable). The communications gateway 202 can also be communicatively coupled to a second communication element 208 (e.g., a telephone or a computing device using web conferencing platform) through a second network 210. In one aspect, the second network 210 can comprise a circuit switched network (e.g., public switched telephone network), packet switched network (e.g., internet protocol based network), and/or the like. The second network 210 can comprise wireless links (e.g., satellite, cellular, WI-FI, WIMAX) and/or wired links (e.g., fiber optical cable, coaxial cable, Ethernet cable). In one aspect, the second communication element 208 can transmit media data (e.g., audio and/or video) through session initial protocol or other suitable protocol.

In one aspect, the system 200 can comprise one or more session elements 212 (e.g., communication session servers, conferencing servers) configured to receive communication data from the communications gateway 202. It should be noted that though three session elements 212 are shown in FIG. 2, the system 200 can comprise a larger or smaller number of session elements 212 according to the details of specific implementations of the system 200. The session elements 212 can be configured to process the communication data such that a user (e.g., participant of a communication session) at the first communications element 204 can communicate with a user (e.g., participant of a communication session) at the second communications element 208. In one aspect, the second communication element 208 and/or first communication element 204 can comprise an internet protocol based telephone, a communication platform, a circuit switched network based telephone, a smart phone, and/or the like. Additionally, the session elements 212 can provide for communication between users at a plurality of communication elements such that each of the users can communicate with a plurality of other users associated with a particular communication session.

In one aspect, the system 200 can comprise a media element 214 (e.g., server) configured to provide media to the session elements 212. For example the media element 214 can provide a variety of sound clips to the session elements 212. In one aspect, the sound clips can comprise a greeting, waiting music, a sound clip announcing the presence of a user, a sound clip requesting a communication session identifier from a user, and the like. In another aspect, the media element 214 can provide updates to a screen of a user using conferencing software on a computing device. For example, the media element 214 can provide images, videos, audio, text, and the like.

In another aspect, the system 200 can comprise a media insertion element 216 (e.g., server) configured to provide additional media to the media element 214. For example, the media insertion element 216 can be configured to receive media from a variety of sources. The media insertion element 216 can be communicatively coupled to the sources through the second network 210. For example, the media insertion element 216 can receive media from a social media element 218. In one aspect, the social media element 218 can provide social media information to the media insertion element 216, such as electronic messages, posts, status updates, and the like. The media insertion element 216 can periodically receive updated social media information associated with a communication session. The media insertion element 216 can convert the social media information into a sound clip and/or video clip. For example, a social media user associated with a communication session can provide a status update (e.g., indicating the social media user will be late to the communication session) to the social media element 218. The social media element 218 can associate the status update with a particular communication session. Then the social media element 218 can convert the status update to a sound clip and/or video clip and provide the status update to users associated with the particular communication session. For example, the communication session can comprise one or more users in communication with each other through the session elements 212. In one aspect, the social media element 218 can comprise the social media system described above.

Additionally, the media insertion element 216 can receive media from a media stream element 220. For example, the media stream element 220 can provide a media stream, such as internet radio, audio and/or video clips, television streams, and/or the like. The media insertion element 216 can receive the media stream from the media stream element 220. One or more media streams from the media stream element 220 can be associated with a user. For example, the media stream can be associated with a customized music station, playlist, or electronic feed associated with the user. Accordingly, the media stream can be delivered to the session element 212, and thus, provided to the user.

In one aspect, the media insertion element 216 can comprise the media controller 110 of FIG. 1. The media insertion element 216 can be implemented as a part of the bridge 102 of FIG. 1. In another aspect, the media insertion element 216 can be implemented at a remote location. Accordingly, the media insertion element 216 can be communicatively coupled to the media element 214 through a network such as the second network 210. In one aspect, the present methods can be performed in the media insertion element 216, media elements 214, session elements 212, communication gateway 202, and communication elements 204 and 208.

Figure 3:
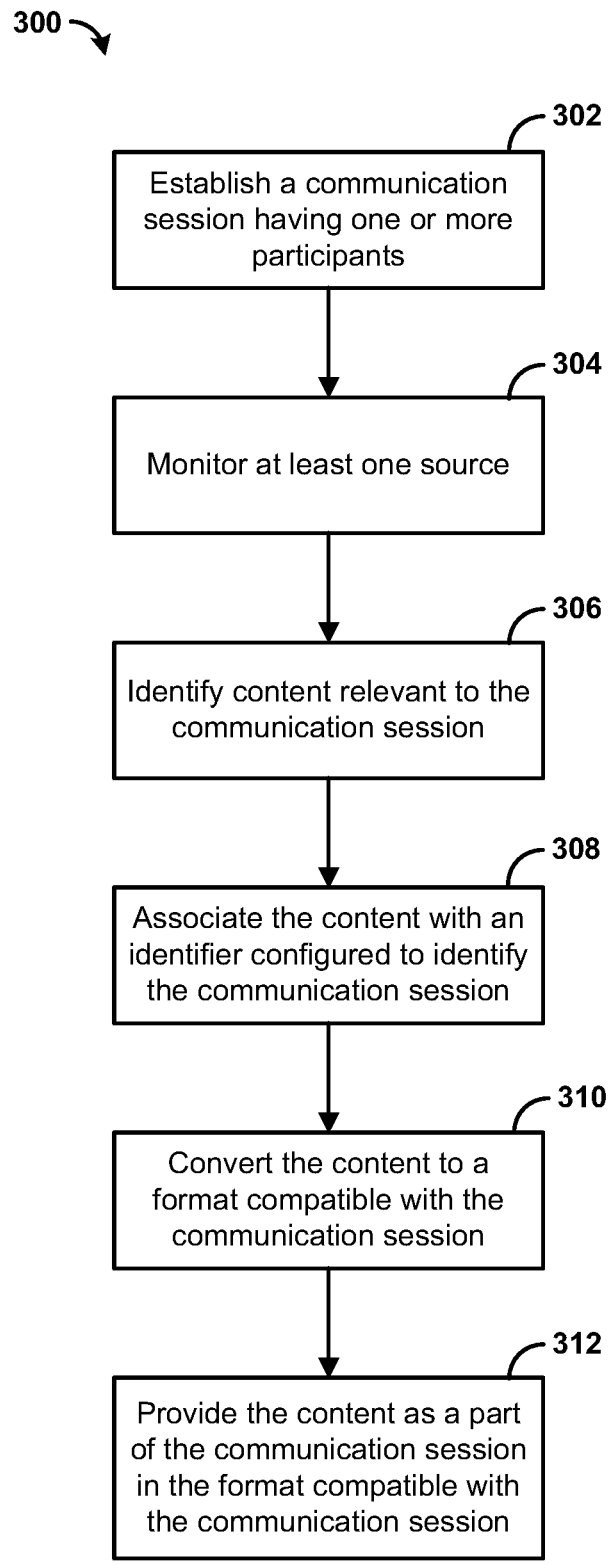
FIG. 3 is a flowchart illustrating an example method for providing content to a communication session.

FIG. 3 is a flowchart illustrating an example method 300 for providing content to a group of users, such as a conference. In step 302, a communication session having one or more participants can be established. For example, one or more communication links can be established between the one or more participants. The communication session, e.g., conference session, can comprise at least one of a video interface, an audio interface, and a web interface for communication between the one or more participants.

In step 304, at least one source can be monitored. The at least one source can comprise a social media system, news provider, email server, electronic message server, audio stream, video stream, and the like. For example, updates to a media feed associated with a participant of the one or more participants can be received. As another example, updates to a media feed associated with an identifier (e.g., conference identifier, communication session identifier) configured to identify the communication session can be received. Additionally, at least one of a short message service (SMS) message, electronic media feed information, status information, and an email message can be received. In one aspect, monitoring the at least one source can comprise processing an RSS feed, blog post, media profile post (e.g., Twitter, Facebook, Google plus, and the like), video stream, audio stream, email inbox, voicemail message inbox, web page, and the like.

In step 306, content relevant to (e.g., associated with, related to, derived from, transmitted to, and the like) a communication session and/or its participants can be identified from the at least one source. Content can comprise a video, audio, images, text, data, and the like. For example, one or more keywords can be located in the content. In one aspect, the one or more keywords can be located in the content by identifying a symbol indicating the content is intended for the communication session. Content relevant to the communication session can comprise status information indicative of the arrival a participant to the communication session.

In step 308, the content can be associated with an identifier (e.g., conference identifier, communication session identifier) configured to identify the communication session. The identifier can comprise a keyword, phrase, or symbol in the content indicating the content is intended for the communication session. For example, the identifier can comprise a hash tag (e.g., #) followed by an alphanumeric and/or other symbolic identifier meeting predefined criteria that can indicate that the content is intended for a communication session. The identifier can comprise audio, video, image, text, or other formatted information. A source of the content can be associated with a participant of the one or more participants or other users not participating in the communication session. In step 310, the content can be converted to a format compatible with the communication session. As an example, text can be converted to speech. As another example, converting the format can comprise converting a video format to another video format, a text format to a video format, an audio format to a text format, an audio format to a video format, and many similar conversions between text, video, audio, and other data through processing and/or transcoding. In step 312, the content can be provided as a part of the communication session in a format compatible with the communication session. For example, the content can be provided as audio, video, text, data, and the like.

Figure 4:
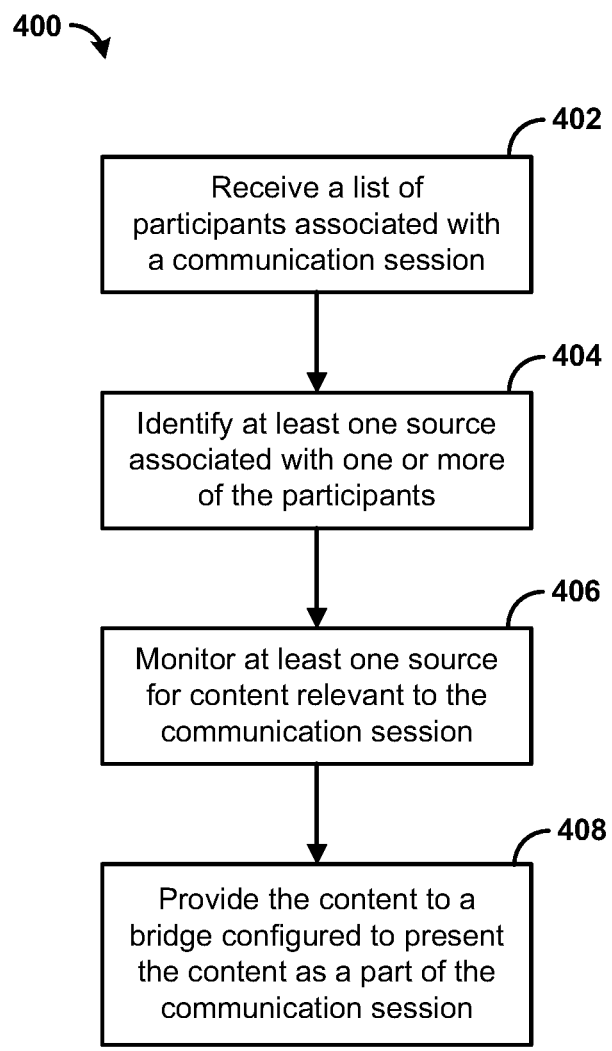
FIG. 4 is a flowchart illustrating another example method for providing content to a communication session.

FIG. 4 is a flowchart illustrating another example method 400 for providing content to a group communication session (e.g., conference session). In step 402, a list of participants associated with a communication session can be received. In step 404, at least one source associated with one or more of the participants can be identified. The at least one source can comprise a social media system, news provider, email server, electronic message server, audio stream, video stream, and the like.

In step 406, the at least one source can be monitored for content relevant to (e.g., associated with, related to, derived from, transmitted to, and the like) the communication session. In one aspect, monitoring the at least one source can comprise processing an RSS feed, blog post, media profile post (e.g., Twitter, Facebook, Google plus, and the like), video stream, audio stream, email inbox, voicemail message inbox, web page, and the like. For example, updates to a media feed associated with a participant of the one or more participants can be received or by other users not associated with the communication session. As another example, updates to a media feed associated with an identifier (e.g., conference identifier, communication session identifier) configured to identify the communication session can be received. Additionally, at least one of a short message service (SMS) message, electronic media feed information, status information, and an email message can be received.

In one aspect of step 406, at least one of a keyword and a symbol indicating the content is intended for the communication session can be identified. For example, the keyword and/or symbol can comprise a hash tag (e.g., #) followed by an alphanumeric and/or other symbolic identifier meeting predefined criteria can indicate that the content is intended for a communication session. The keyword and/or symbol can comprise an image, audio, video, text, or other format. Content can comprise video, audio, images, text, data, and the like. For example, content relevant to the communication session can comprise status information indicative of the arrival of a participant of the one or more participants to the communication session.

In step 408, the content can be provided to a bridge (e.g., conference bridge) configured to present the content as a part of the communication session in a format compatible with the communication session. For example, the communication bride can be configured to convert the content to the format compatible with the communication session. As a further example, the content can be converted from text to speech. As another example, converting to a format compatible with the communication session can comprise converting a video format to another video format, a text format to a video format, an audio format to a text format, an audio format to a video format, and many similar conversions between text, video, audio, and other data through processing and/or transcoding. In another aspect, the content can be converted to the format compatible with the communication session before the content is provided to the bridge. In one aspect, the content can be provided as an image, audio, video, text, data, and the like to one or more participants of the communication session.

Figure 5:
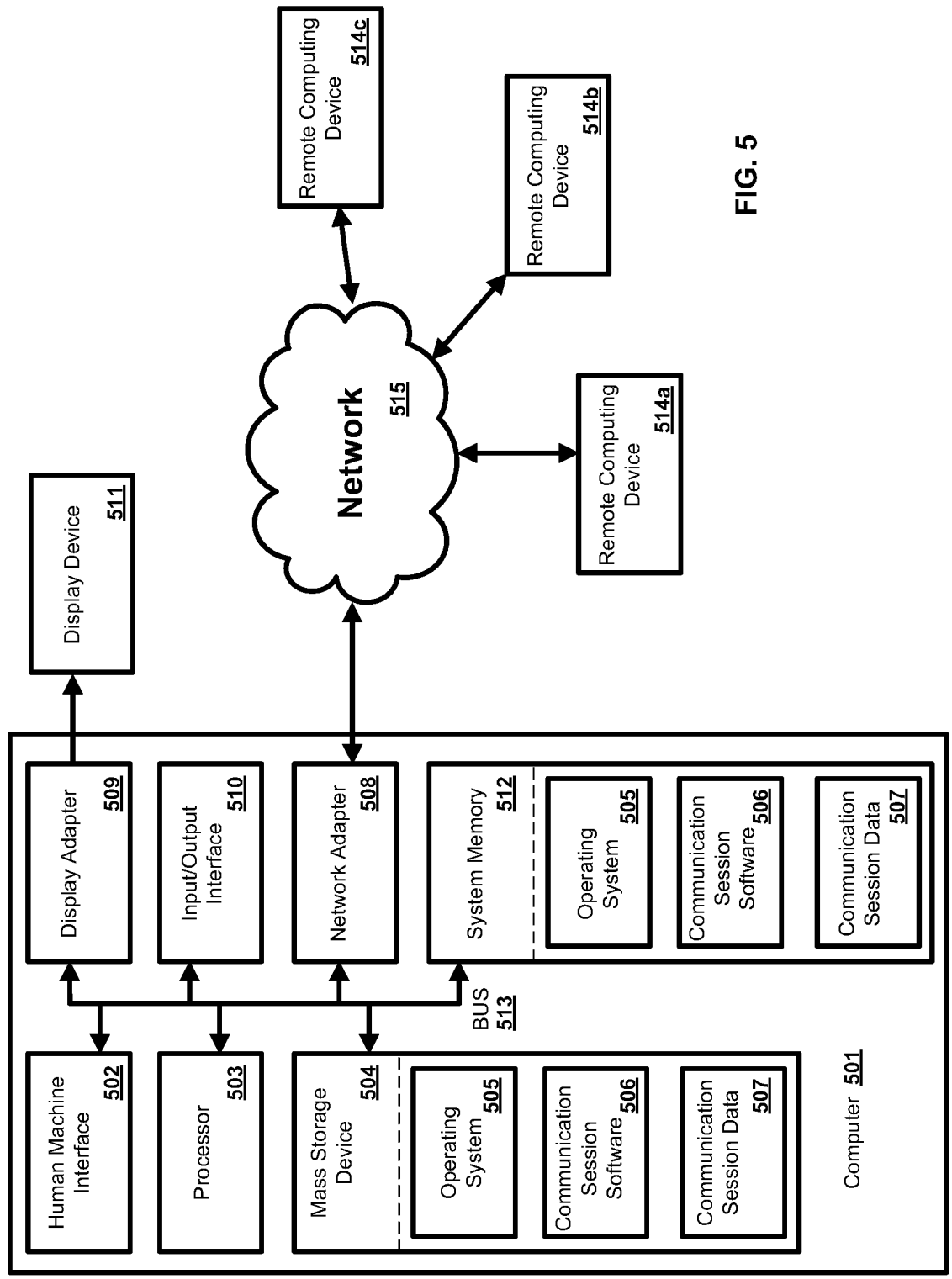
FIG. 5 is a block diagram illustrating an example computing system in which the present systems and methods can operate.

In an exemplary aspect, the methods and systems can be implemented on a computer 501 as illustrated in FIG. 5 and described below. By way of example, the media controller 110 of FIG. 1 and/or the media insertion element 216 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, communication session software 506, communication session data 507, a network adapter 508, system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as communication session data 507 and/or program modules such as operating system 505 and communication session software 506 that are immediately accessible to and/or are presently operated on by the processing unit 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and communication session software 506. Each of the operating system 505 and communication session software 506 (or some combination thereof) can comprise elements of the programming and the communication session software 506. communication session data 507 can also be stored on the mass storage device 504. communication session data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like. The display 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of communication session software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a computing device, an indication of a message associated with a first participant device associated with a communication session comprising one or more additional participant devices, wherein the first participant device has not yet joined the communication session;
   generating, based on the message being related to the communication session, a video overlay inserted into visual content of the communication session comprising at least a portion of the message; and
   causing the visual content comprising the video overlay to be output at each of the one or more additional participant devices via the communication session, wherein the first participant device has not yet joined the communication session when the video overlay is caused to be output.

2. The method of claim 1, wherein the message comprises at least one of:
   an electronic message (e-mail);
   a short message service (SMS) message;
   a social media post; or
   an identifier configured to identify the communication session.

3. The method of claim 1, wherein the message is indicative of an arrival time of an invitee, associated with the first participant device, to the communication session.

4. The method of claim 1, wherein causing the video overlay to be output as part of the video stream at the one or more additional participant devices via the communication session comprises converting the message to text, wherein the video overlay comprises the text.

5. The method of claim 1, wherein the video overlay comprises a web conference notification.

6. The method of claim 1, wherein the communication session comprises at least one of a video interface, an audio interface, or a web interface for communicating between the first participant device and the one or more additional participant devices.

7. The method of claim 1, wherein the first participant device comprises a first mobile device, and wherein the one or more additional participant devices each comprise a mobile device, a tablet device, a laptop, a television, or a computer.

8. An apparatus comprising:
   one or more processors; and
   memory storing processor-executable instructions that, when executed by the one or more processors, cause the apparatus to:
   receive an indication of a message associated with a first participant device associated with a communication session comprising one or more additional participant devices, wherein the first participant device has not yet joined the communication session;
   generate, based on the message being related to the communication session, a video overlay inserted into visual content of the communication session comprising at least a portion of the message; and
   cause the visual content comprising the video overlay to be output at each of the one or more additional participant devices via the communication session, wherein the first participant device has not yet joined the communication session when the video overlay is caused to be output.

9. The apparatus of claim 8, wherein the message comprises at least one of:
   an electronic message (e-mail);
   a short message service (SMS) message;
   a social media post; or
   an identifier configured to identify the communication session.

10. The apparatus of claim 8, wherein the message is indicative of an arrival time of an invitee, associated with the first participant device, to the communication session.

11. The apparatus of claim 8, wherein the processor-executable instructions that cause the apparatus to cause the video overlay to be output as part of the video stream at the one or more additional participant devices via the communication session further cause the apparatus to convert the message to text, wherein the video overlay comprises the text.

12. The apparatus of claim 8, wherein the video overlay comprises a web conference notification.

13. The apparatus of claim 8, wherein the communication session comprises at least one of a video interface, an audio interface, or a web interface for communicating between the first participant device and the one or more additional participant devices.

14. The apparatus of claim 8, wherein the first participant device comprises a first mobile device, and wherein the one or more additional participant devices each comprise a mobile device, a tablet device, a laptop, a television, or a computer.

15. One or more non-transitory computer-readable storage media comprising processor-executable instructions that, when executed by at least one processor of a computing device, cause the computing device to:
   receive an indication of a message associated with a first participant device associated with a communication session comprising one or more additional participant devices, wherein the first participant device has not yet joined the communication session;
   generate, based on the message being related to the communication session, a video overlay inserted into visual content of the communication session comprising at least a portion of the message; and
   cause the visual content comprising the video overlay to be output at each of the one or more additional participant devices via the communication session, wherein the first participant device has not yet joined the communication session when the video overlay is caused to be output.

16. The one or more non-transitory computer-readable storage media of claim 15, wherein the message comprises at least one of:
- an electronic message (e-mail);
- a short message service (SMS) message;
- a social media post; or
- an identifier configured to identify the communication session.

17. The one or more non-transitory computer-readable storage media of claim 15, wherein the message is indicative of an arrival time of an invitee, associated with the first participant device, to the communication session.

18. The one or more non-transitory computer-readable storage media of claim 15, wherein the processor-executable instructions that cause the computing device to cause the video overlay to be output as part of the video stream at the one or more additional participant devices via the communication session further cause the computing device to convert the message to text, wherein the video overlay comprises the text.

19. The one or more non-transitory computer-readable storage media of claim 15, wherein at the video overlay comprises a web conference notification.

20. The one or more non-transitory computer-readable storage media of claim 15, wherein the communication session comprises at least one of a video interface, an audio interface, or a web interface for communicating between the first participant device and the one or more additional participant devices, wherein the first participant device comprises a first mobile device, and wherein the one or more additional participant devices each comprise a mobile device, a tablet device, a laptop, a television, or a computer.

* * * * *